United States Patent [19]

Buma

[11] Patent Number: 4,565,151
[45] Date of Patent: Jan. 21, 1986

[54] APPARATUS FOR INDICATING A RANGE POSITION FOR AN AUTOMATIC TRANSMISSION INSTALLED IN A VEHICLE

[75] Inventor: Shuuichi Buma, Toyota, Japan

[73] Assignee: Toyota Jidosha Kabushiki Kaisha, Japan

[21] Appl. No.: 613,530

[22] Filed: May 24, 1984

[30] Foreign Application Priority Data

Jun. 8, 1983 [JP] Japan ............................. 58-088293[U]

[51] Int. Cl.⁴ .............................................. G01D 5/02
[52] U.S. Cl. ........................... 116/28.1; 116/DIG. 20; 74/473 R
[58] Field of Search ...... 116/28.1, DIG. 20, 321–323, 116/278; 74/473 R, 473 P, 475; 277/DIG. 7

[56] References Cited

U.S. PATENT DOCUMENTS

| | | | |
|---|---|---|---|
| 1,037,631 | 9/1912 | Jones | 277/DIG. 1 |
| 3,645,149 | 2/1972 | Fitzpatrick et al. | 74/473 R |
| 3,929,092 | 12/1975 | Ogura | 116/28.1 |
| 3,998,109 | 12/1976 | O'Brien | 74/475 |
| 4,137,864 | 2/1979 | Lauper | 116/28.1 |
| 4,191,064 | 3/1980 | Houk et al. | 116/28.1 |
| 4,513,276 | 4/1985 | Kubota et al. | 116/28.1 |

FOREIGN PATENT DOCUMENTS 2288640  5/1976  France ............................. 116/28.1

Primary Examiner—Charles Frankfort
Assistant Examiner—Patrick R. Scanlon
Attorney, Agent, or Firm—Parkhurst & Oliff

[57] ABSTRACT

The present invention relates to an apparatus for indicating a range position for an automatic transmission installed in a vehicle. The apparatus includes a slide cover whose thickness is varied to accomplish a smooth slide on rounded corner portions. The slide cover has a range position indicating member which indicates the selected position to an operator when an operator moves a manual control lever to select another range position.

4 Claims, 4 Drawing Figures

APPARATUS FOR INDICATING A RANGE POSITION FOR AN AUTOMATIC TRANSMISSION INSTALLED IN A VEHICLE

BACKGROUND OF THE INVENTION

The present invention relates to an apparatus for indicating a range position for a relatively compact automatic transmission installed in a vehicle, and more particularly to an apparatus mounted on a vehicle floor, for indicating a range position for an automatic transmission.

In an automatic transmission installed in a vehicle, there has been provided an apparatus for indicating a range position adjacent to a manual control lever which is operated by an operator to obtain another range position.

In such an apparatus, a slide cover for indicating a range position for an automatic transmission is provided and a manual control lever is fitted through the slide cover. This slide cover has a range position indicating member designed to indicate the range position to an operator when a manual control lever is operated.

To make the indicating apparatus more compact, a slide cover is curved as a whole in the direction where a manual control lever slides. As the slide cover slides, the longitudinal ends of the slide cover hang down into the space which is defined under the slide cover for allowing the curved slide cover to enter. As the slide cover is curved over its length, the space occupied by the apparatus for indicating a range position for an automatic transmission, can be compact.

However, when a slide cover is curved as a whole, an apparatus for indicating a range position also has to be curved. This is a disadvantageous limitation for the design of the apparatus for indicating a range position.

It is preferable that the apparatus for indicating a range position for an automatic transmission has a plane form a flat face as large as possible, from the standpoint that an operator can see it more easily than a curved face. In order to satisfy this requirement, it has been proposed that small rounded corner portions be provided at the positions where the plane form ends and on which a slide cover slides, both ends of the slide cover extending downwardly after sliding over the small rounded corner portions. The conventional slide cover is designed to have a uniform thickness, and the slide cover has to be thick in order to obtain the required stiffness around a shaft portion of a manual control lever. Hence, when this thick slide cover slides through a narrow space defined at the small rounded corner portions, the frictional resistance to sliding increases and disrupts for the smooth operation of a manual control lever.

Contrary to this, if a slide cover is to be thin, the stiffness of the slide cover around a shaft portion of a manual control lever cannot be sufficient and the slide cover is deformed when an operator slides the manual control lever.

SUMMARY OF THE INVENTION

The present invention was made in view of the foregoing background and to overcome the foregoing drawbacks. It is accordingly an object of this invention to provide an apparatus for indicating a range position for an automatic transmission installed in a vehicle, which can obtain a plane or flat range indicating portion.

To attain the above objects, an apparatus according to the present invention for indicating a range position for an automatic transmission having a manual control lever comprises:

a member on which marks for designating range positions are disclosed;

a range position indicating means which is actuated by the manual control lever and indicates the selected range position disclosed on the member, the range position indicating means having a relatively thin thickness at each longitudinal end thereof compared with a relatively greater thickness at the central area around the manual control lever; and upper plates fixed on a vehicle floor to form small clearance between them, for allowing the range position indicating means to slide therebetween, the upper plates having rounded corner portions on which the range position indicating means slides.

BRIEF DESCRIPTION OF THE DRAWINGS

The above objects, features and advantages of the present invention will become more apparent from the following description of the preferred embodiments taken in conjunction with the accompanying drawings, wherein.

DETAILED DESCRIPTION OF THE PREFERRED EMBODIMENT

The present invention is described in detail with reference to the accompanying FIGS. 1–4 which illustrate an embodiment of the present invention.

Figure 1:
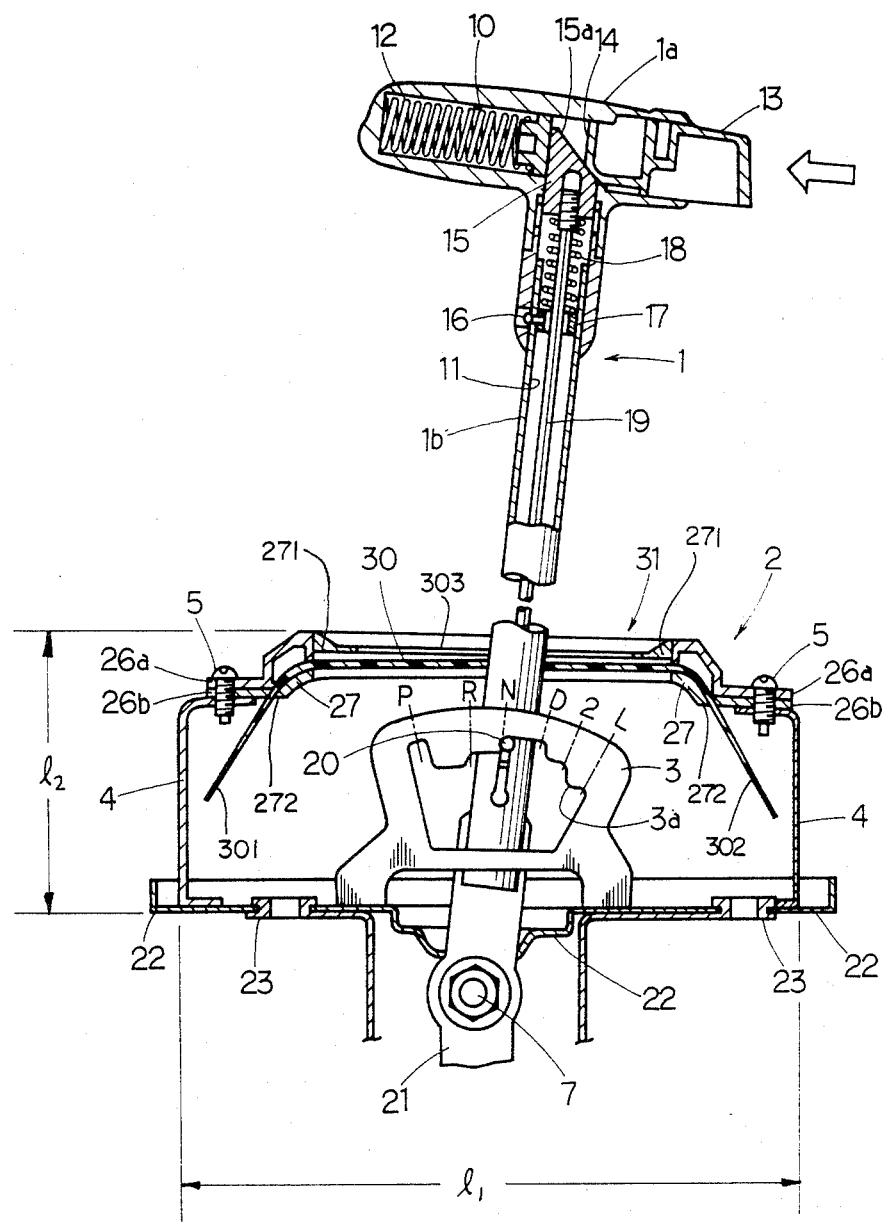
FIG. 1 is a partial cross-sectional view of an apparatus according to the embodiment of the present invention.

FIG. 1 shows a partial cross-sectional view of an apparatus according to the present invention. A manual control lever 1 includes a knob portion 1a and a shaft portion 1b. The knob portion 1a is shown in FIG. 1 in a rotated condition, the knob portion 1a being rotated by an angular amount of 90° from the normal position. The knob portion 1a has a longitudinally extending cylindrical hole 10 therein, and the longitudinal axis of this cylindrical hole 10 intersects with the longitudinal axis of the shaft portion 16 at an angle of preferably approximately 90°. A coil spring 12 and a knob button 13 are provided in the cylindrical hole 10. The knob button 13 is positioned in the cylindrical hole 10 at an end opposite from the spring 12 (the right side of the knob portion 1a in FIG. 1) so that the spring 12 biases the knob button 13 to the right in FIG. 1. The knob button 13 has a vertically extending hole 14 therein, in FIG. 1. A sleeve 15, which is slidably disposed within an inner cylindrical face 11 of the shaft portion 1b, is fitted into the hole 14 within the knob button 13. The sleeve 15 includes an inclined upper portion 15a and a lower portion. A coil spring 18 is provided between the lower portion of the sleeve 15 and a member 17 which is fixed by a screw 16 to the inner cylindrical face 11. The sleeve 15 is thus biased in the upward direction in FIG.

1 by the biasing force of the coil spring 18. Hence, the inclined upper portion 15a of the sleeve 15 is in engagement with the portion of the knob button 13 that defines the hole 14 in the knob button 13.

Further, the sleeve 15 is threadably engaged with a detent rod 19 which is located within the shaft portion 1b of the manual control lever 1 so that the sleeve 15 is secured to the detent rod 19. A detent pin 20 is provided on the lower portion of the detent rod 19, and the detent pin 20 engages a detent plate 3 for holding the selected range position. Thus, the sleeve 15, the detent rod 19, and the detent pin 20 are secured to each other, and they are upwardly biased by the coil spring 18. The upward bias is regulated according to the position where the detent pin 20 engages a stepped gate 3a of the detent plate 3.

The lower end of the shaft portion 1b is integrally secured by welding to a rotation lever 21 which is rotatably mounted around a control shaft 7. Hence, the manual control lever 1 is mounted for rotation around the control shaft 7. A bracket 22 supports the control shaft 7 for rotation thereon. The detent plate 3 is mounted on the bracket which is fastened by a bolt to a vehicle floor at its collar portion 23.

A case 2 for a range position indicating device, as shown in FIG. 1, is fixed to the vehicle floor. A slide cover 30 has a hole 34 (FIG. 2) therein and the shaft portion 1b of the manual control lever 1 extends through the hole 34. The longitudinal ends (front end 301 and rear end 302) of the slide cover 30 are slidably mounted on small rounded corner portions 27 formed on upper plates 26a, and 26b, and a small clearance is formed between the upper plates 26a and 26b for the slide cover 30. That is, a first aperture 271 is defined between a first upper plate 26a and a second upper plate 26b at the front and rear portions of the case 2. A second aperture 272 is also provided at the front and rear portions of the case 2 in the second upper plate 26b. As the manual control lever 1 slides to the right and left in FIG. 1, the small rounded corner portions 27 which are disposed in the forward and rearward directions in the vehicle. The upper plates 26a and 26b are fastened by screws 5 to a bracket 4 which extends from the manual control lever mounting bracket 22.

Figure 2:
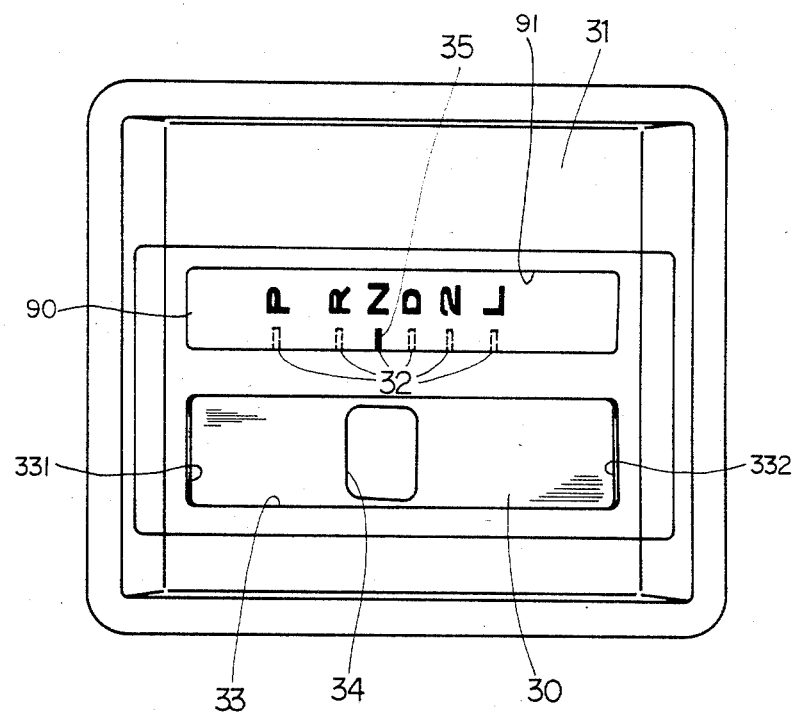
FIG. 2 is a plan view of a range position indicating portion of the apparatus according to the embodiment of the present invention.

A range position indicating portion 31 of the range position indicating device is formed in the central part of the upper plate 26a, as shown in FIG. 2. The indicating portion 31 includes an elongated opening 91 covered by a position scale 90. The position scale 90 is generally flat, and letters for indicating range positions for an automatic transmission are provided in a row on the surface of the range position indicating portion 31. For example, the letters such as P, R, N, D, 2, and L are provided on the indicating portion 31 and identify Park, Reverse, Neutral, Drive, Second, and Low, respectively.

Small opaque apertures 32 are provided on the scale 90 of the range position indicating portion 31 at the positions thereof corresponding to the range position letters. The apertures indicate the selected range position when a range position indicating member or colored projection 35 is located under one of apertures. The range position indicating portion 31 has an opening or elongated slot 33 in which the shaft portion 1b of the manual control lever 1 slides between front end 331 and rear end 332 of the opening 33. An intermediate part 303 of the slide cover 30 is mounted under the range position indicating portion 31. The intermediate portion 303 of the slide cover 30 extends on almost the same plane as that of the indicating portion 31, and closes the opening 33 therein, thereby obscuring the case 2 for the inside of the range position indicating device from an operator's sight.

Figure 3:
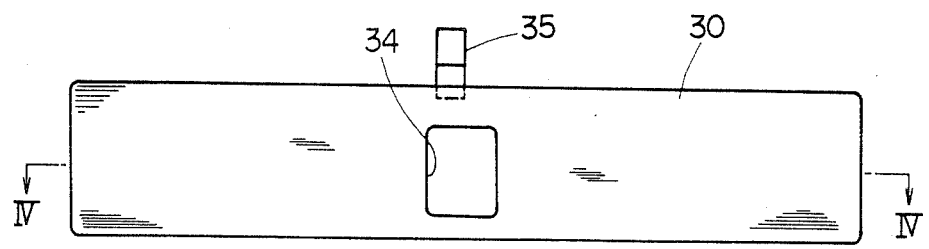
FIG. 3 is a plan view of a slide cover employed in the apparatus shown in FIG. 1.
Figure 4:
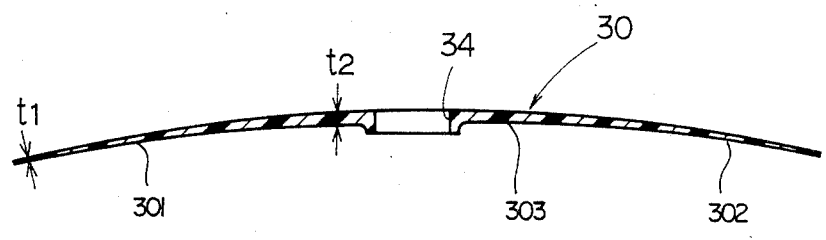
FIG. 4 is a cross-sectional view taken along the line IV—IV shown in FIG. 3.

The slide cover 30, as shown in FIGS. 3 and 4, is a plate which is relatively long in its longitudinal direction and narrow in its lateral direction. The slide cover 30, for example, is preferably made of polyamide. The slide cover 30 has the hole 34 at central portion thereof through which the shaft portion 1b of the manual control lever 1 extends. The thickness of the slide cover 30, as shown in FIG. 4, is greatest at its central portion where the hole 34 is provided, and gradually decreases from the central portion to each longitudinal end 301, 302. According to one example the slide cover has about a total length of 210 mm. Preferably the thickness $t_1$ indicated in FIG. 4 is 0.4 mm, and the central thickness $t_2$ indicated in FIG. 4 is 0.8 mm. According to this example, the stiffness of the slide cover 30 around the hole 34, in which the manual control lever 1 is fitted, is sufficient for that necessitated by the slide movement of the manual control lever 1. The thin end portions of the slide cover 1 easily slide through the small rounded corner portions 27. According to the present embodiment, the radius of the rounded corner portion 27 is a relatively small value, preferably about 25 mm.

The range position indicating member or projection 35 is fixed by adhesive to the central portion of the side surface of the slide cover 30, as shown in FIG. 3. This range position indicating member 35 is located at a position under one of the apertures 32 corresponding to the range position indicating letter. The range position indicating member 35 is normally colored red. The selected range position is indicated by where the red color of the range position indicating member 35 is seen through one of the apertures 32, thereby indicating the position selected. The selected range position, shown in FIG. 2, is N the neutral position.

In operation of the above-described apparatus, an operator pushes the knob button 13 of the manual control lever 1 to change from one range position to another. The sleeve 15 is downwardly pressed when the knob button 13 is pushed. Hence, the detent rod 19 slides downwardly, along with the detent pin 20 mounted on the detent rod 19. The downward movement of the rod 19 and detent pin 20 releases the engagement of the detent pin 20 with the stepped gate 3a of the detent plate 3. As a result, the manual control lever 1 can be pivoted above the control shaft 7.

In this condition, while the operator holds the knob portion 1a and rotates the manual control lever 1 around the control shaft 7 (the right or left direction in FIG. 1) the desired range position is selected. When the manual control lever 1 rotates around the control shaft 7, the slide cover 30 in which the shaft portion 1b of the manual control lever, is fitted, slides in the right or left directions in FIG. 1. The range position indicating member 35, which is secured to the slide cover 30, is moved to the aperture 32 corresponding to the selected range position, thereby indicating the selected range position.

When the slide cover 30 slides according to the rotation of the manual control lever 1, the longitudinal ends 301, 302 of the slide cover 30 slide through the aperture 271, 272 and over the rounded corner portions 27, defined between the upper plates 26a and 26b. Hence, the slide cover 30 can follow the shape of the rounded corner portions. Further the frictional resistance generated at the rounded corner portions is small since the forward and rearward ends 301, 302 of the slide cover 30 are relatively thin compared with that of the or intermediate portion 303 of the slide cover. Hence, the slide cover 30 can easily slide through the clearances of the rounded corner portions. This provides a smooth feeling when shifting the manual control lever 1.

Further, a space is provided under the slide cover within the case 2. The ends 301, 302 of the slide cover 30 occupy this space when the longitudinal ends of the slide cover 30 hang down from the corner portions 27. Hence, the longitudinal length of the case 2 for the range position indicating device can be compact. That is, the horizontal length $l_1$ and the vertical length $l_2$ of the case 2 can be reduced relative to known range indicating devices since the apertures 271, 272 guide the ends 301, 302 of the slide cover into the relatively compact space.

Further, as the central portion 303 of the slide cover 30, has a greater thickness than the ends, the stiffness of the slide cover 30 is maintained.

While the present invention has been described in its preferred embodiments, it is to be understood that the invention is not limited thereto, and may be otherwise embodied within the scope of the following claims.

What is claimed is:

1. An apparatus for indicating a range position for an automatic transmission having a manual control lever to be movably operated by a vehicle operator to obtain a selected range position, said apparatus comprising:
   a case fixed to a vehicle floor and having an upper plate with an elongated slot through which said control lever extends, first and second ends of said elongated slot defining a range of movement of said manual control lever, said upper plate having an elongated window adjacent said elongated slot, a pair of first apertures each being located adjacent an end of said slot, a corresponding pair of second apertures each being located adjacent a corresponding one of said first apertures, and a pair of corner portions each disposed in a passage between corresponding apertures of said first and second pairs of apertures;
   a control position scale fixed within said elongated window, said control position scale having a series of apertures corresponding to range positions; and
   a range position indicating means inserted within said slot and slidably moved by operation of said manual control lever for indicating the selected range position in one aperture of said series of apertures in the control position scale, the range position indicating means having a relatively thick intermediate portion adjacent said manual control lever and relatively thin end portions, the end portions slidably disposed within the passages defined by said pairs of first and second apertures and extending over said corner portions to bend said end portions away from said upper plate, the intermediate portion being disposed in a plane generally parallel to said upper plate.

2. The apparatus of claim 1, wherein the range position indicating means has an opening in the intermediate portion through which the manual control lever is inserted, and the range position indicating means moves together with the manual control lever when the manual control lever is operated by the operator to obtain the selected range position of an automatic transmission.

3. The apparatus of claim 1, wherein the thickness of the range position indicating means gradually decreases from the intermediate portion to the end portions.

4. An apparatus for indicating a range position for an automatic transmission having a manual control lever pivotably mounted on a vehicle floor for movable operation by a vehicle operator for selecting any one of a series of range positions, said apparatus comprising:
   a case fixed to a vehicle floor and having first and second plates and a clearance space therebetween, said first plate having an elongated slot through which said control lever extends and an elongated window opening located adjacent said elongated slot, said second plate being located adjacent a lower surface of said first plate and defining a pair of first apertures between said first and second plates, each first aperture located adjacent one end of said elongated slot, said second plate including a pair of second apertures each located adjacent one of said first apertures, and a pair of rounded corner portions each formed between corresponding apertures of said first and second pairs of apertures;
   a control position scale fixed within said elongated window, said control position scale having a series of apertures each corresponding to one of said series of range positions; and
   a slide cover located in said elongated slot on a lower surface of said first plate, said slide cover having an opening through which said control lever extends and a projection adjacent said opening on a side of said slide cover nearest said control position scale, said slide cover having a gradually decreasing thickness from an intermediate portion of said slide cover toward each end portion of said slide cover, said intermediate portion being disposed in a generally horizontal plane under the first plate, the end portions of said slide cover being inserted through said first and second apertures and bent downwardly toward said vehicle floor along said rounded corner portions.

* * * * *